March 25, 1947. H. H. HEUERMAN 2,417,871
VEHICLE TOW BAR
Filed Oct. 17, 1944
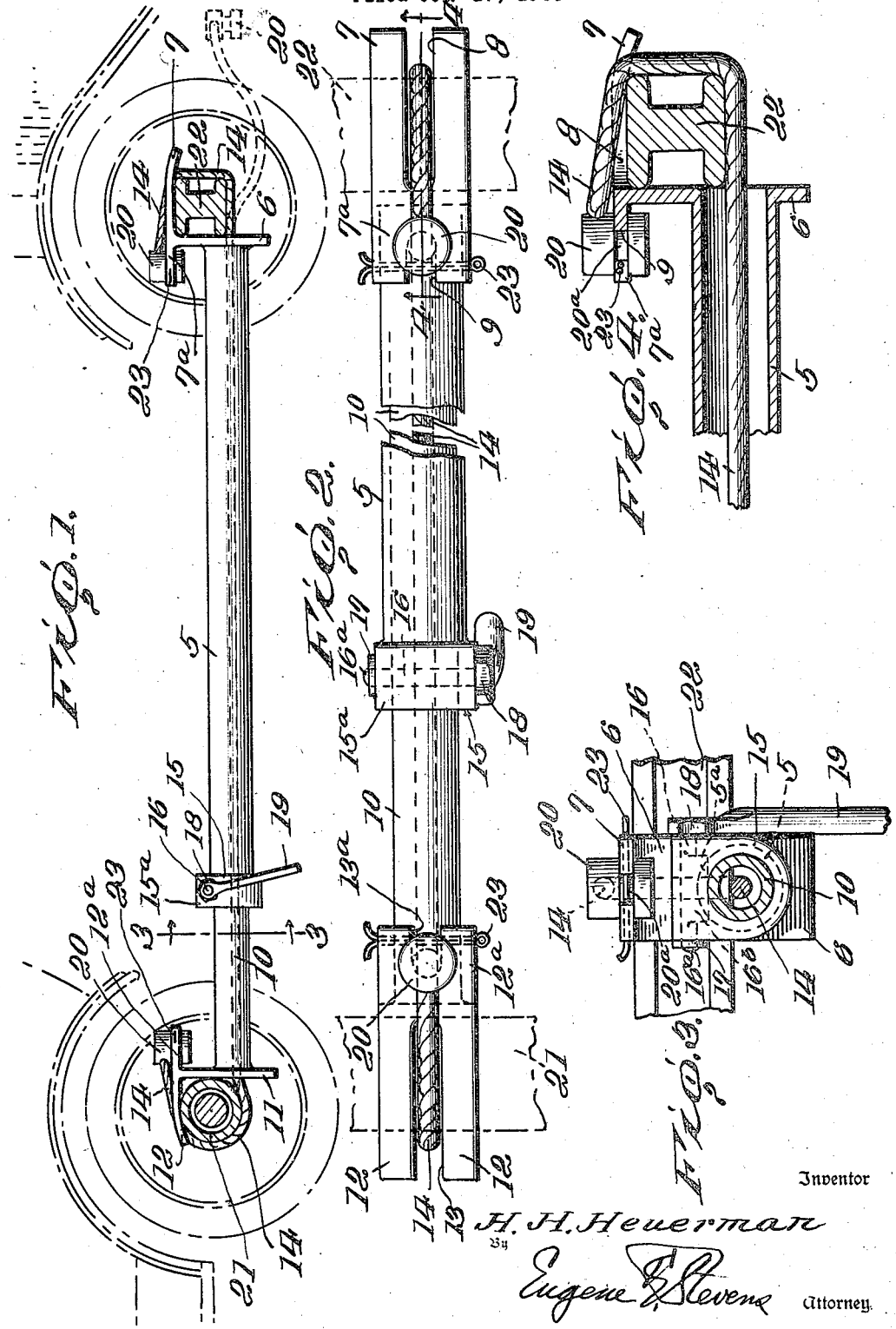
Inventor
H. H. Heuerman
By Eugene F. Stevens Attorney.

Patented Mar. 25, 1947

2,417,871

UNITED STATES PATENT OFFICE 2,417,871

VEHICLE TOW BAR

Henry H. Heuerman, Winter Haven, Fla.

Application October 17, 1944, Serial No. 559,032

5 Claims. (Cl. 280—33.14)

My invention relates to towing means and especially a tow pole whereby a disabled vehicle can be towed by another.

Briefly and generally stated, the invention has among its objects to provide a device of the character specified which is simple in construction; readily attachable and detachable; can be reduced in lineal dimension for storage purposes and locked in variable extension for use; and employs novel hook-up means whereby it is adapted to be supported and braced against axles or bumpers of the towing and towed vehicles.

Other objects and advantages of the invention will be readily appreciated from a reading of the following detailed description of the now preferred example of the invention, reference being had to the accompanying drawing illustrating the same.

It should be understood, however, that the invention is susceptible of other mechanical expressions within the spirit and scope of the subject matter claimed hereinafter.

In the drawing, wherein the same reference characters have been used to designate the same parts throughout the several views, Fig. 1 is a side elevational view of my tow pole showing the application of same to a towing and towed vehicle;

Fig. 2 is a top plan view thereof;

Fig. 3 is a cross-sectional view taken on the line 3—3 of Fig. 1, and

Fig. 4 is a longitudinal view taken on the line 4—4 of Fig. 2.

Referring to the drawings by reference characters, numeral 5 designates a length of tube having at its outer end a transverse axle-engageable stop plate 6 whose upper end has the forwardly extending axle supported flange extension 7. This axle-supported extension 7 has the medial slot 8 opening from its outer end to receive a portion of cable 14 for a purpose to be hereinafter explained.

Flange 7 has the rear extension 7a which has the medial cable-terminal-receiving slot 9, detailed reference to which will be made later.

Telescoping into the inner end of the tube length 5 is a second tube length 10 of smaller diameter, whose outer end is likewise provided with an axle-engageable stop plate 6 whose upper end has a forwardly extending axle-supported flange 12 and rearwardly extending cable terminal keeping flange 12a. These flanges are inwardly slotted as indicated at 13, and 13a, respectively.

Extended through the communicating linear passages of the tubes 5, 10 is a cable 14, preferably of metal, and having secured in any desired manner to its ends the preferably cylindrical blocks 20 whose peripheries are cut with a circumferential groove 20a. In use the block grooves 20a admit of insertion of the cable terminal blocks 20 into the rear flange slots 9 or 13a and slidably embrace adjacent portions of the associated rear flange extensions 7a or 12a, as shown.

In order to retain the tube members 5, 10 in a predetermined lineally adjusted relationship, I provide the inner end of the tube length 5 with clamp means, carried by a collar or clip 15 which is welded, or otherwise secured thereto. In the illustrated embodiment of the invention, the collar 15 is shown with a thickened and flattened top portion, and extending transversely therethrough is the pin 16 having the cam portion 16b intermediate its ends, as best shown in Fig. 3.

A lever 19 carried by a nut 18 secured at one end of cam pin 16 serves to turn the cam 16b into locking engagement with the inner tube 10 through a slot, or cutout 5a in tube 5 (Fig. 3). The opposite end of pin 16 has the flange 16a to retain it against withdrawal and there is preferably provided the washer which is interposed between said pin flange and the outer periphery of the tube 5, as shown in Fig. 2.

From the foregoing description, taken in connection with the drawing, the manner of use of the device will, it is believed, be readily understood. When the device is to be applied, one of the vertical end flanges (6, for instance) is disposed against the front axle 22 of the vehicle to be towed, with the associated axle-supported extension 7 resting upon the said axle. Then the cable 14 is pulled about the axle 22, into the slot 8 in flange 7, and the adjacent terminal block is slid into place in the slot 9 of rear flange extension 7a. Thereupon the cotter pin 23 is inserted through horizontal holes in flange 7a to span the slot 9 to retain the terminal block in said slot.

Next the cable 14 is turned about the rear axle 21 of the towing vehicle, passed into the slot 13 of the axle supported flange 12 of tube 10, and its other terminal block 20 slid into place in the slot 13a of the associated rear flange 12a. If the tubes 5, 10 have not heretofore been locked in relative adjusted relationship, this is now done by manipulation of the cam pin 16, 16b, 16a (see Fig. 3) by manipulation of lever 19. A second cotter pin 23 is employed, as explained in connection with the other terminal block 20 to retain the last mentioned block in slot 13a of flange 12a.

The device is obviously extremely simple, strong and durable, and easily applied and removed. Needless to say the cable and loops may be secured to vehicle bumpers as well as axles. Cable 14 being free to slide in the communicating bores of tubes 5, 10 will tighten itself; and the clamp 19, 16, 16b locks the two tubes together against relative lineal movement in service. Thus danger of the two vehicles smashing into one another, in case the towing vehicle is stopped suddenly, is avoided.

Having thus described my invention, what I claim as new is:

1. A towing connection for vehicles comprising in combination, a pair of extensible members, a cable extending through said members and beyond the ends thereof and adapted to be looped about a vehicle axle or bumper, means for locking said members in different relatively adjusted positions, an offset axle-supported flange extension at the outer end of each of said extensible members, a substantially vertical axle-stop flange connecting said axle supported flanges to said respective tube ends, and means carried by one of each of said pairs of flanges for securing the adjacent cable end thereto, said offset axle-supported flange having a cable-receiving slot opening from its outer end, a transversely grooved terminal block secured to each end of said cable, and slotted block-receiving keepers at the ends of said tubes.

2. The combination set forth in claim 1, and said extensible members being telescoping tube members, said locking means comprising a lever-operated cam-type clamp carried by the outermost of said tube members and having a portion adapted to lockingly engage the other tube member, said offset axle-supported flange having a cable-receiving slot opening from its outer end, a transversely grooved terminal block secured to each end of said cable, and slotted block-receiving keepers at the ends of said tubes.

3. A towing connection for vehicles comprising in combination, an elongated tubular member, a cable extending through said member and beyond the ends thereof and adapted to be looped about a vehicle axle or bumper, means for securing the ends of said cable to the adjacent end of said tubular member and the latter in abutting relationship to the axle, and said means at one end of said tubular member comprising an offset axle supported flange extension disposed laterally of the plane of the tubular member whereby to dispose said tubular member in substantial alignment with an axle, a substantially vertical axle stop flange connecting said axle supported flange to said tubular member, said axle supported flange having an open slot in its end adapted to receive said cable, an enlargement on the end of said cable and said axle supported flange having a slotted rear extension adapted to receive said cable and engage said enlargement.

4. A towing connection for vehicles comprising in combination, an elongated tubular member, a cable extending through said member and beyond the ends thereof and adapted to be looped about a vehicle axle or bumper, an off-set axle supported flange extension at the outer ends of said tubular member, a substantially vertical axle stop flange connecting said axle supported flanges to the respective ends of said tubular member, means carried by one of each of said pairs of flanges for securing the adjacent cable end thereto, said axle supported flanges being off-set laterally beyond the axis of said tubular member whereby pressure against said axle stop flange will be substantially in line with the axis of said tubular member, at least one of said off-set axle supported flanges having a cable receiving slot opening from its outer end, a transversely grooved terminal block secured to the adjacent end of said cable, and a slotted block receiving keeper at the end of said tubular member.

5. A towing connection for vehicles comprising in combination, an elongated tubular member, a cable extending through said member and beyond the ends thereof and adapted to be looped about a vehicle axle or bumper an off-set axle supported flange extension at the outer ends of said tubular member, a substantially vertical axle stop flange connecting said axle supported flanges to the respective ends of said tubular member, means carried by one of each of said pairs of flanges for securing the adjacent cable end thereto, said axle supported flanges being off-set laterally beyond the axis of said tubular member whereby pressure against said axle stop flange will be substantially in line with the axis of said tubular member, at least one of said off-set axial supporting flanges having a cable receiving slot opening from its outer end, a terminal block on the end of the cable adjacent the slotted axial supported flange and said axial supported flange having a recess adapted to receive said block whereby to anchor the cable.

HENRY H. HEUERMAN.

REFERENCES CITED

The following references are of record in the file of this patent:

UNITED STATES PATENTS

| Number | Name | Date |
|---|---|---|
| 1,273,064 | Huber | July 16, 1918 |
| 1,435,064 | Holmes | Nov. 7, 1922 |
| 1,563,860 | Jacobson | Dec. 1, 1925 |